United States Patent [19]
Wang

[11] Patent Number: 5,722,472
[45] Date of Patent: Mar. 3, 1998

[54] WOOD WORKING MACHINE

[76] Inventor: Tian Wang Wang, No. 45, Yi Chang East Road, Taiping City, Taichung Hsien, Taiwan

[21] Appl. No.: 805,931
[22] Filed: Feb. 25, 1997
[51] Int. Cl.⁶ .................................................. B25H 1/00
[52] U.S. Cl. ........................ 144/286.1; 83/859; 144/1.1; 144/286.5
[58] Field of Search ................... 144/1.1, 2.1, 186.1, 144/253.5; 83/574, 471, 474, 477.2, 859

[56] References Cited

U.S. PATENT DOCUMENTS 4,445,553   5/1984   Hanyzewski et al. .............. 144/48.1
5,165,317  11/1992   Findlay ............................. 144/286.1
5,191,935   3/1993   McCombie ....................... 144/286.1

*Primary Examiner*—W. Donald Bray
*Attorney, Agent, or Firm*—Charles E. Baxley, Esq.

[57] ABSTRACT

A wood working machine includes a base secured on top of a stand and having a platform secured on the rear portion for supporting a cutter device. A pair of rails are secured in parallel on the front portion of the base. A table has a pair of tracks slidably engaged on the rails for smoothly moving the table along the rails. The base is pivotally coupled to the stand. A pair of arms have an upper portion pivotally coupled to the base and have an oblong hole for slidably engaging with two fasteners of the stand and for allowing the base to be rotated about the pivot shaft.

2 Claims, 3 Drawing Sheets

WOOD WORKING MACHINE

BACKGROUND OF THE INVENTION

1. Field of the Invention

The present invention relates to a wood working machine, and more particularly to a wood working machine having a stable workpiece moving mechanism.

2. Description of the Prior Art

Typical wood working machines comprise a work piece support pivotally coupled to the base and rotatable about the base for moving the work piece toward the cutter device. However, the work piece may not be precisely supported and fed to the cutter device.

The present invention has arisen to mitigate and/or obviate the afore-described disadvantages of the conventional wood working machines.

SUMMARY OF THE INVENTION

The primary objective of the present invention is to provide a stable work piece support for stably supporting and feeding the work piece to the cutter device.

The other objective of the present invention is to provide a stable work piece support which may be rotated upward for allowing work person to repair the cutter device easily.

In accordance with one aspect of the invention, there is provided a wood working machine comprising a stand, a base secured on top of the stand, the base including a front portion and a rear portion, a platform secured on the rear portion of the base, a cutter device secured on the platform, a pair of rails secured in parallel on the front portion of the base, and a table slidably engaged on the rails, the table includes a pair of tracks slidably engaged on the rails for smoothly guiding the table to move along the rails.

The table includes two ends each having a bar and a stop secured to the bar for limiting a relative movement of the table to the base.

The stand includes an upper portion having a pair of fasteners, the base is pivotally coupled to the stand at a pivot shaft, the wood working machine includes a pair of arms each having an upper portion pivotally coupled to the base and each having an oblong hole for slidably engaging with the fasteners and for allowing the base to be rotated about the pivot shaft.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
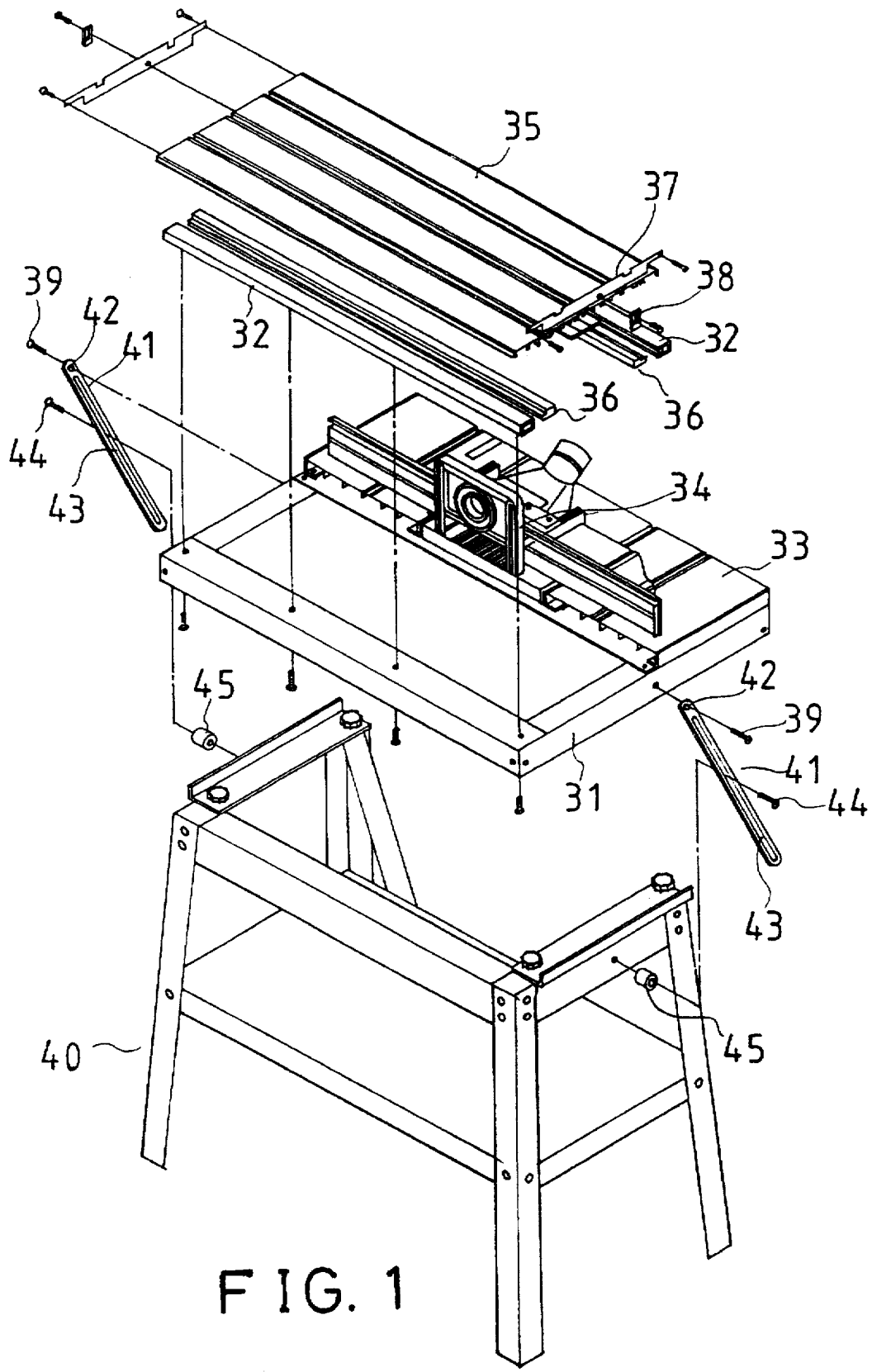
FIG. 1 is an exploded view of a wood working machine in accordance with the present invention.
Figure 2:
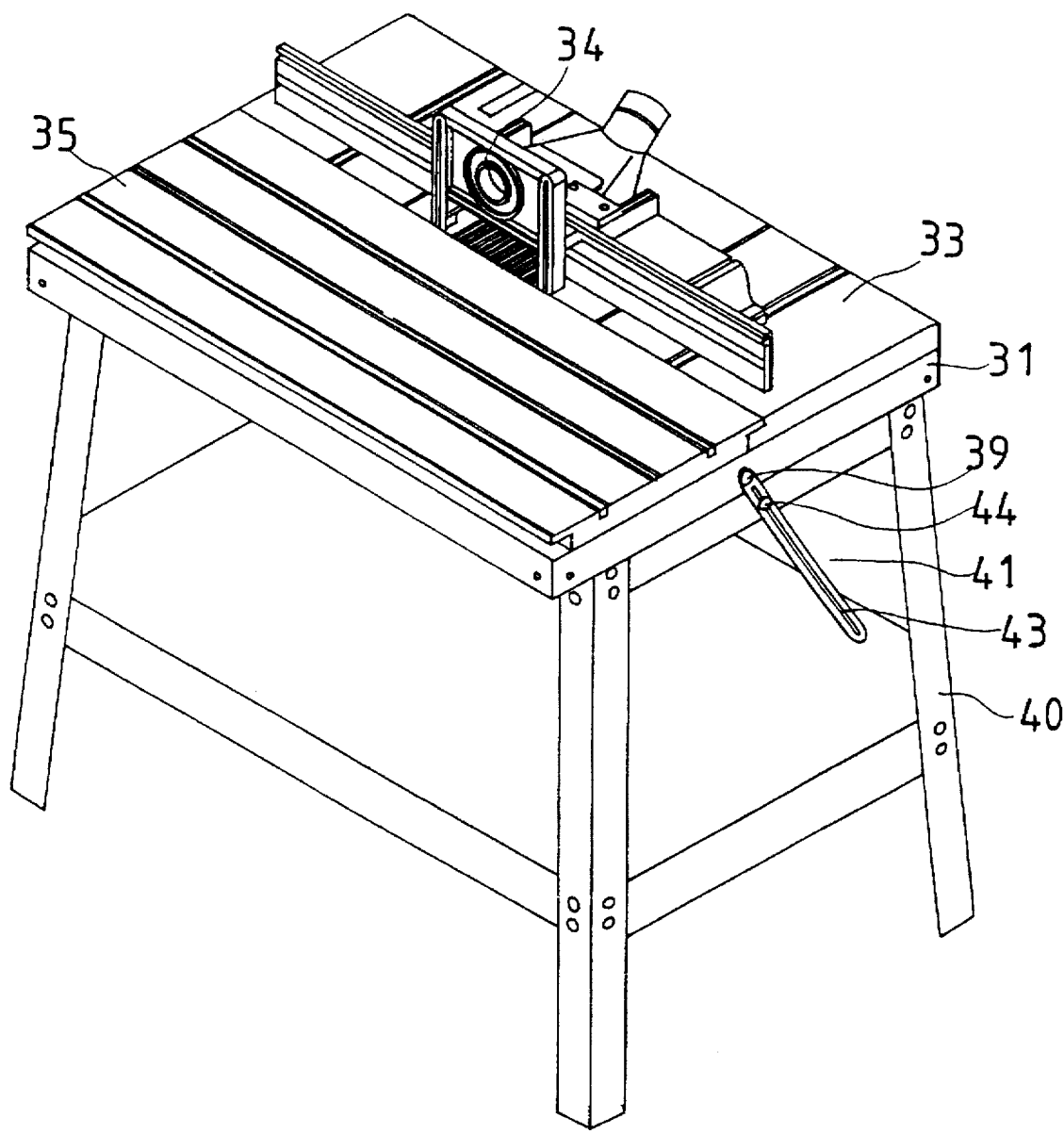
FIG. 2 is a perspective view of the wood working machine.
Figure 3:
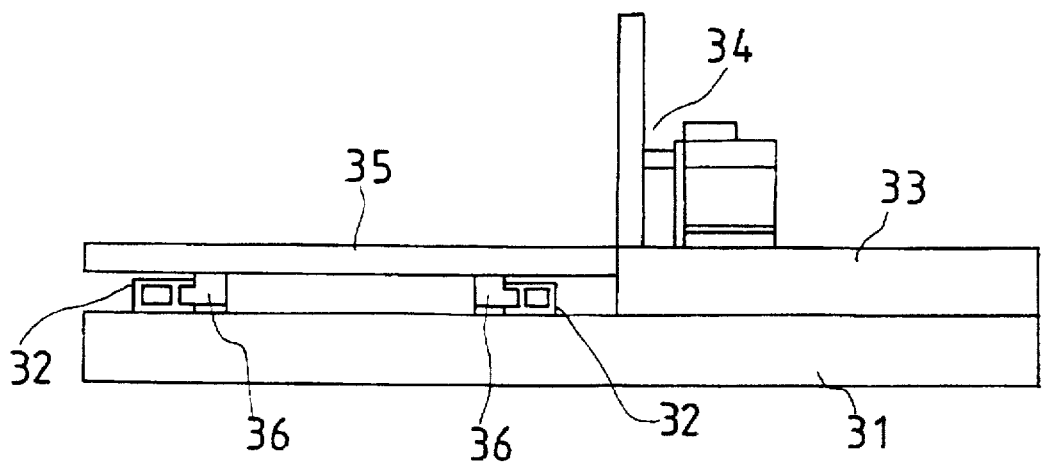
FIG. 3 is a side view of the base of the wood working machine.

Referring to the drawings, and initially to FIGS. 1 to 3, a wood working machine in accordance with the present invention comprises a stand 40 including a pair of pads 45 secured on top for engaging with fasteners 44. A base 31 is supported on top of the stand 40 and is pivotally coupled to the stand 40 at a pivot shaft 47 (FIG. 4) for allowing the base 31 to be rotated about the pivot shaft 47 and for allowing the base 31 to be moved upward for allowing the work person to fix or repair the cutter device 34. A platform 33 is secured on the rear portion of the base 31 for supporting the cutter device 34. A pair of arms 41 include an upper portion 42 pivotally coupled to the base 31 at the pivot pins 39 and each includes an oblong hole 43 for engaging with the fastener 44 and for limiting the rotational movement of the base 31 about the pivot shaft 47. The fasteners 44 may secure the arms 41 and the base 31 in place.

A pair of rails 32 are secured in parallel on the front portion of the base 31. A table 35 for supporting a work piece includes a pair of tracks 36 secured to the bottom and slidably engaging with the rails 32 for allowing the table 35 to smoothly and precisely move the work piece across the cutter device 34. A pair of bars 37 are secured to the end portions of the table 35 and each includes a stop 38 secured thereto for engaging with another stop provided in the rails 32 and for limiting the sliding movement of the table 35 relative to the base 31.

The table 35 is thus stably supported and slidably engaged on the base 31 such that the work piece may be smoothly moved across the cutter device.

Figure 4:
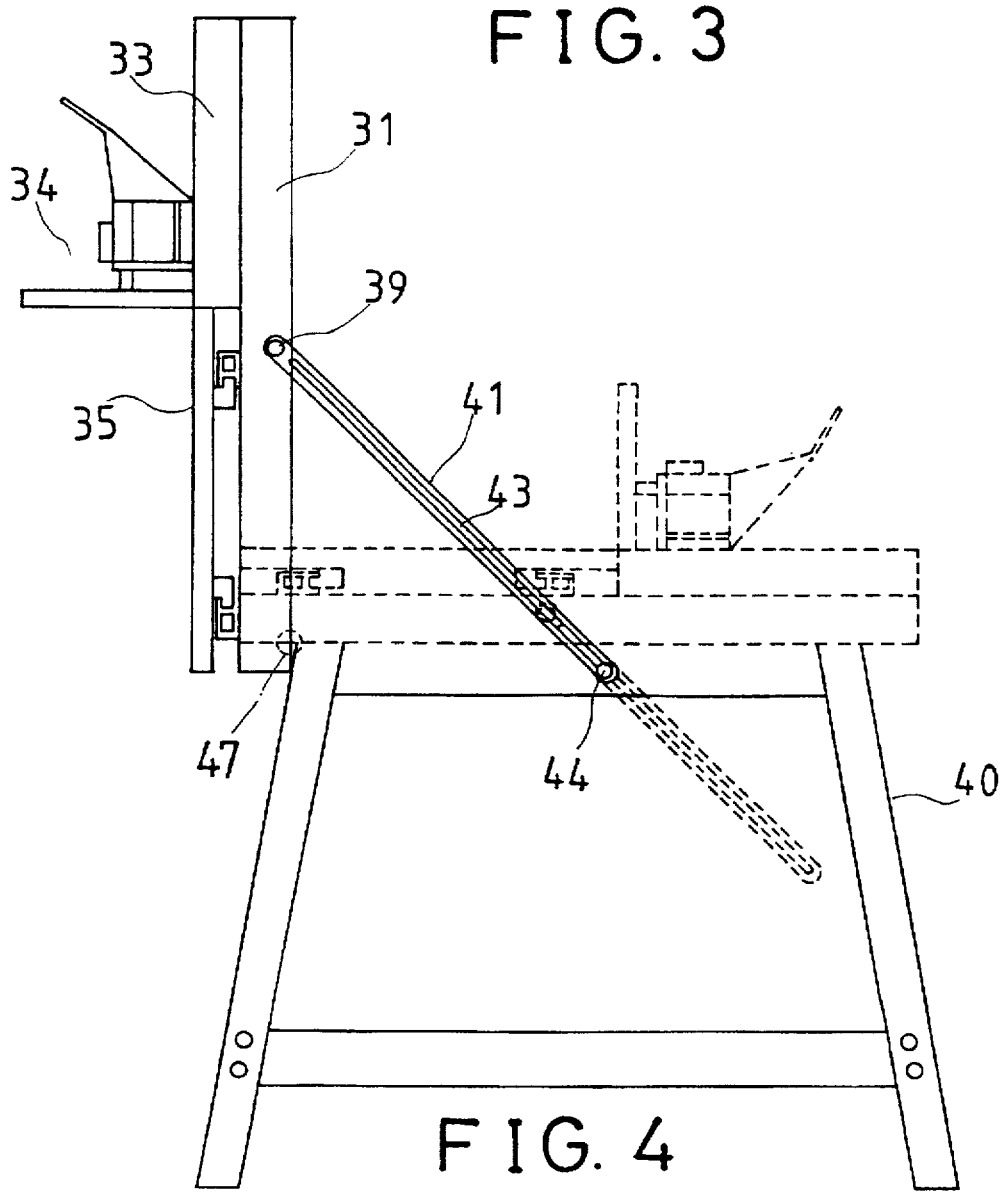
FIG. 4 is a side view illustrating the operation of the wood working machine.

Referring next to FIG. 4, the base 31 may be rotated upward about the pivot shaft 47 for allowing the work person to fix or repair the cutter device 34. The arms 41 may stably secure the base 31 in place.

Accordingly, the wood working machine includes a stable work piece support for stably supporting and feeding the work piece to the cutter device. The work piece support may be rotated upward for allowing work person to repair the cutter device easily.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wood working machine comprising:
    a stand including an upper portion having a pair of fasteners,
    a base secured on top of said stand and pivotally coupled to said stand at a pivot shaft, said base including a front portion and a rear portion,
    a pair of arms each having an upper portion pivotally coupled to said base and each having an oblong hole for slidably engaging with said fasteners and for allowing said base to be rotated about said pivot shaft,
    a platform secured on said rear portion of said base,
    a cutter device secured on said platform,
    a pair of rails secured in parallel on said front portion of said base, and
    a table slidably engaged on said rails, said table including a pair of tracks slidably engaged on said rails for smoothly guiding said table to move along said rails.

2. A wood working machine according to claim 1, wherein said table includes two ends each having a bar and a stop secured to said bar for limiting a movement of said table relative to said base.

* * * * *